United States Patent [19]
Antoniello

[11] 4,083,383

[45] Apr. 11, 1978

[54] FAUCET ASSEMBLY

[75] Inventor: Frank Antoniello, Levittown, N.Y.

[73] Assignee: T & S Brass and Bronze Works, Inc., Westbury, N.Y.

[21] Appl. No.: 717,573

[22] Filed: Aug. 26, 1976

[51] Int. Cl.² .............................................. F16K 3/02
[52] U.S. Cl. ................................. 137/616.7; 251/174; 251/363
[58] Field of Search ...................... 137/615, 616, 616.3, 137/616.5, 616.7; 251/172, 174, 352, 363

[56] References Cited

U.S. PATENT DOCUMENTS

| | | | |
|---|---|---|---|
| 39,795 | 9/1863 | Broughton | 137/616.7 |
| 131,601 | 9/1872 | Crossley | 137/616.7 |
| 2,576,414 | 11/1951 | Peterson | 137/616.7 |
| 2,623,752 | 12/1952 | Wentz et al. | 137/616.3 X |
| 3,009,679 | 11/1961 | Williams | 251/363 X |
| 3,037,738 | 6/1962 | Jackson et al. | 251/174 X |
| 3,104,674 | 9/1963 | Bills et al. | 137/616.7 X |
| 3,198,210 | 8/1965 | Lewis | 137/616.5 |
| 3,235,224 | 2/1966 | Grove | 251/174 |
| 3,401,915 | 9/1968 | Kim | 251/174 |
| 3,726,318 | 4/1973 | Hyde | 137/616.7 X |

FOREIGN PATENT DOCUMENTS

| | | | |
|---|---|---|---|
| 103,045 | 1/1924 | Switzerland | 251/352 |
| 10,542 | 12/1906 | United Kingdom | 251/352 |

Primary Examiner—Alan Cohan
Assistant Examiner—Gerald A. Michalsky
Attorney, Agent, or Firm—Kane, Dalsimer, Kane, Sullivan & Kurucz

[57] ABSTRACT

A faucet assembly including a spigot having a passageway therethrough is provided. One end of the spigot is open for exit of fluid and the other end is adapted to be rotatably connected to one end of a stationary fitting. The other end of the fitting is adapted to be removably connected to a fluid source. The fitting has a passageway therethrough. A valve is provided and is operable upon rotation of the spigot to a predetermined angular degree relative to the fitting to open and close a flow path for flow of fluid between the fitting and spigot and consequently between a source of fluid and the open exit end of the spigot. Seals are provided on the fitting and spigot to prevent leakage of fluid in the open and closed positions of the valve and to thereby restrict fluid flow.

7 Claims, 5 Drawing Figures

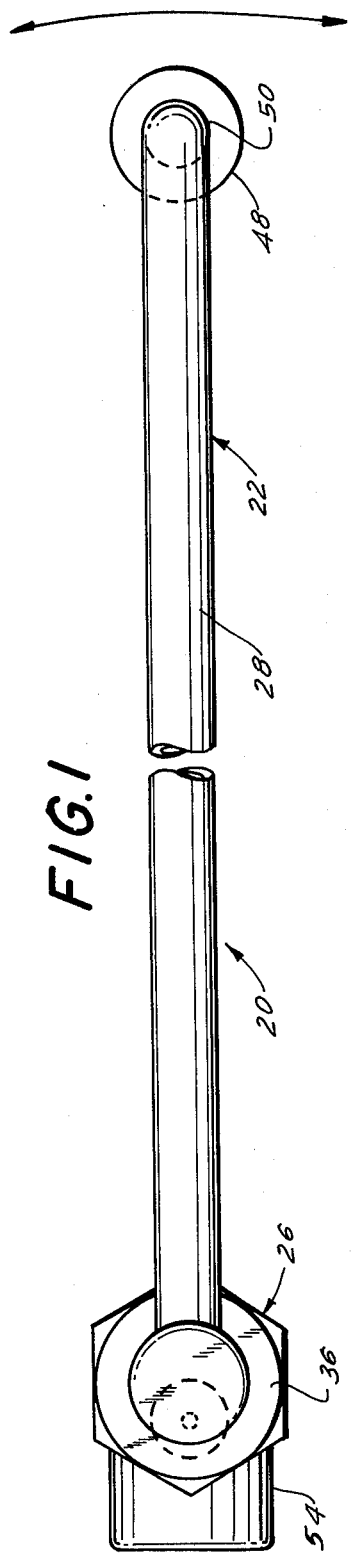
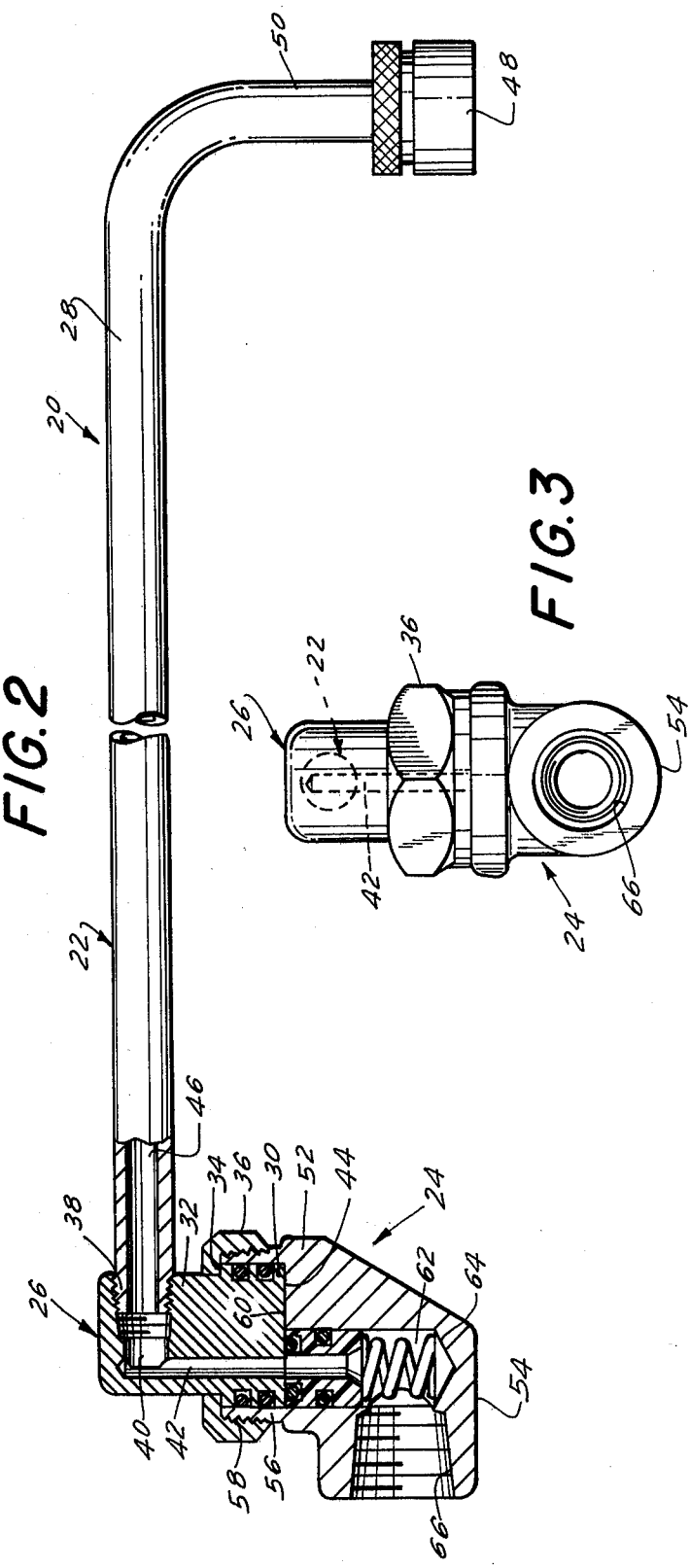

FAUCET ASSEMBLY

BACKGROUND OF THE INVENTION

There are many environments for faucets where simplicity in operation is required due to factors such as available time and space for the user. An example of such an environment is in a restaurant kitchen, particularly a Chinese restaurant kitchen where cooks are often required to use water often during cooking procedures and it is required that the faucet be rapidly turned on and off many times. It is customary for the cook to prepare his food in a receptacle held within a sink and to turn the faucet on and off many times in rapid succession over a long period of time. Accordingly, the faucet should be designed to accomplish the on and off functions rapidly and efficiently without leakage over a long period of time.

It is extremely desirable to provide a faucet which can be operated by merely rotating the spigot angularly a predetermined minimum distance to shift between the on and off positions. In this manner, there is no need for faucet handles and all of the valve structure is incorporated as part of the faucet assembly. Naturally with the valve incorporated as part of the spigot, it is important that effective seals be employed so that the relatively rotating parts are not subject to leakage. It should also be kept in mind that where repeated use is desired such as in a Chinese kitchen, the off-on function should be accomplished with a minimum amount of movement to accomplish the valving feature as quickly and efficiently as possible.

SUMMARY OF THE INVENTION

With the above background in mind, it is among the primary objectives of the present invention to provide a faucet assembly which is adapted to be easily and efficiently shifted between the on and off positions by rotating the spigot arm a predetermined amount. The valving mechanism is housed within the spigot arm and the fitting for attachment to the source of fluid. The assembly is designed so that effective and long lasting seals are provided between the moving parts and surrounding the passageway for fluid to pass through the assembly. The sealing means is of the type which is highly wear resistant so that repeated operation of the valve to turn the faucet on and off over a long period of time will not cause deleterious wear to the sealing means and ultimate leakage. A faucet assembly is provided with a minimum number of components and which can be opened and closed with a simple motion with a small angular rotation of the spigot arm.

The faucet assembly is adapted particularly for use in kitchens such as in Chinese restaurants where it is highly desirable to have an elongated spigot arm extending perpendicular to the wall into the central portion of the sink and where the spigot arm can be used as the on and off valve mechanism for water flowing through the faucet assembly. The object is to provide an assembly where the spigot arm can be moved in either direction to the right or to the left to close the flow and to a range of intermediate positions where a chosen valume of water is permitted to flow through the assembly. Appropriate sealing means are provided to seal the surfaces moving with respect to one another and the passageway for the water through the assembly in a positive and effective manner to provide for a highly wear resistant sealing assembly which is long lasting in nature even when used repeatedly on a daily basis.

The assembly is of a minimum number of components and is easily attachable to a source of fluid such as pipes directing water to a kitchen sink.

In summary, the faucet assembly includes a spigot having a passageway therethrough. One end of the spigot is open for exit of fluid and the other end is adapted to be rotatably connected to one end of a fitting. The other end of the fitting is adapted to be removably connected to a fluid source. The fitting has a passageway therethrough. Valve means is provided operable upon rotation of the spigot a predetermined degree relative to the fitting to open and close a flow path for flow of fluid between the fitting and spigot and consequently between a source of fluid and the open exit end of the spigot. Finally, sealing means is on the fitting and spigot to prevent leakage of fluid in the open and closed positions of the valve means and to thereby restrict fluid flow to the passageways through the assembly.

With the above objects amoung others in mind, reference is made to the attached drawings.

BRIEF DESCRIPTION OF THE DRAWINGS

In the drawings:

FIG. 1 is a top plan view of the faucet assembly of the invention with the central portion removed, the valve in the open position, and an arrow showing direction of rotation of the spigot arm;

FIG. 2 is a partially sectional side elevation view thereof;

FIG. 3 is an end elevation view thereof;

DESCRIPTION OF THE PREFERRED EMBODIMENT

Figure 4:
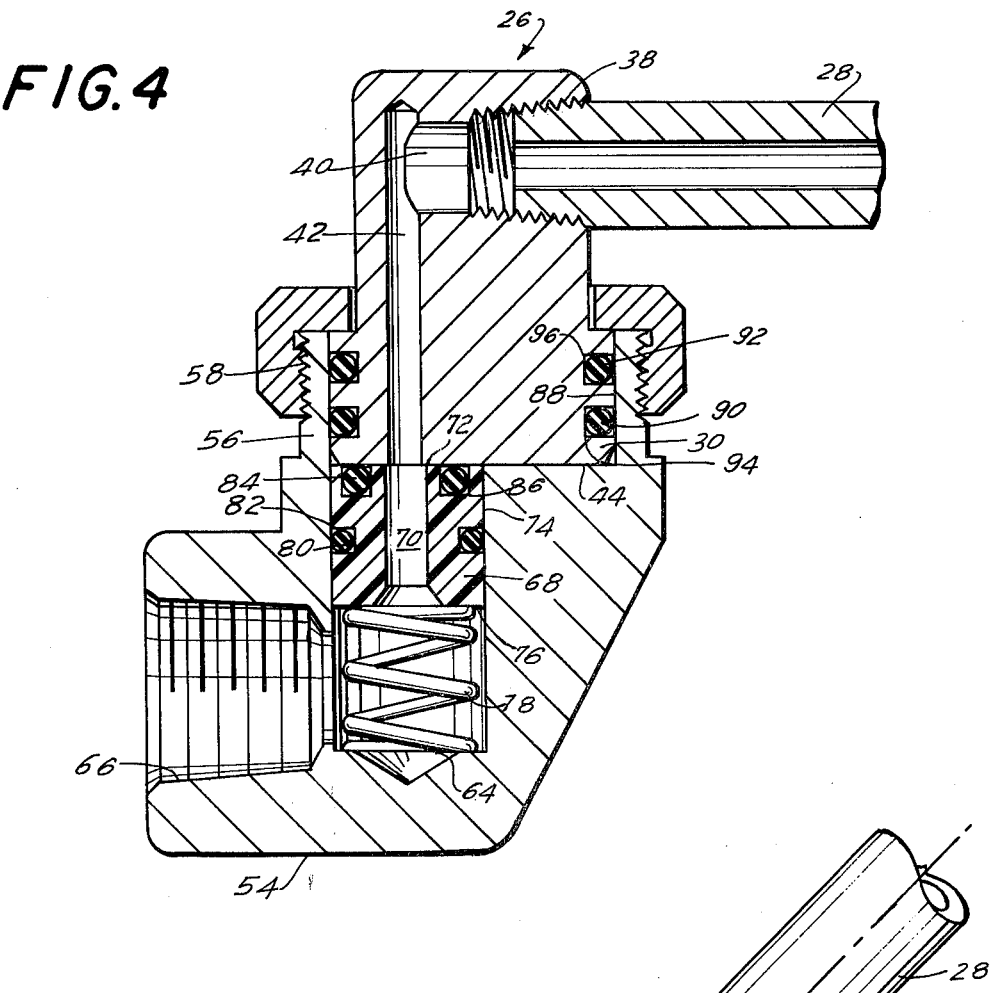
FIG. 4 is an enlarged sectional view of a portion of the spigot arm and the fitting attached thereto.

Faucet assembly 20 is shown in the depicted embodiment in the form of a device which is designed particularly for ues in a cooking kitchen such as in a Chinese restaurant.

Faucet assembly 20 includes a spigot assembly 22 and a fitting 24. The spigot 22 includes a swivel piece portion 26 and a spigot arm 28. The swivel piece portion is a substantially upright cylindrical member having an enlarged lower portion 30 and a narrower diameter upper portion 32 so as to form an annular shoulder 34. The swivel piece 26 is substantially cylindrical in configuration. A swivel nut 36 is mounted in surrounding relationship to the upper portion 32 and designed to be slidable with respect thereto into engagement with shoulder 34.

Swivel piece 26 is retained in position by swivel nut 36 at the shoulder 34 of the swivel piece and by spigot arm 28 at the upper portion. The spigot arm has a threaded end 38 which is designed to be threadedly interengaged with a threaded lateral aperture 40 in the upper end portion 32 of swivel piece 26. Lateral aperture 40 communicates with a smaller diameter vertical aperture 42 extending to the bottom end 44 of the swivel piece and being eccentrically located with respect to the central vertical axis of the swivel piece 26. The combined lateral passageway 40 and vertical passageway 42 form a through passageway in swivel piece 26.

The spigot arm 28 has a through passageway 46 which communicates with passageway 40 when the spigot arm 28 is threadedly interengaged with the swivel piece 26. Passageway 46 extends the entire length of spigot arm 28 and terminates in an open nozzle and aerator assembly 48 which provides the exit for water passing through the faucet assembly. Assembly 48 is on the terminal end of a downwardly extending flange portion 50 of the spigot arm 28 where water can be carried an extended distance from swivel piece 26 and then directed downwardly for vertical discharge through assembly 48.

Fitting 14 is substantially L-shaped in configuration so as to have a vertical portion 52 and a horizontal portion 54. Vertical portion 52 terminates in a cylindrical neck 56 at its upper end having a threaded outer surface 58 which is adapted for threaded interengagement with threaded swivel nut 36 to couple the spigot 22 with the fitting 24. A lateral shoulder 60 extends inwardly from the inner vertical surface of the neck 58 to form a receiving surface for the bottom edge 44 of swivel piece 26 of the spigot. Eccentrically located in the vertical portion 52 of fitting 24 is vertical passageway 62 which is of larger diameter than the vertical passageway 42 in swivel piece 26. The upper end of passageway 62 opens into the recess formed by neck 56 as an opening in the shoulder or wall 60. Passageway 62 does not extend the full height of vertical portion 52 and has a closed bottom end 64. However, horizontally extending portion 54 has a threaded aperture 66 therein which communicates with the bottom end portion of passageway 62 to provide a through opening from the distal end of lateral portion 54 to the upper end of vertical portion 52. Threaded opening 66 is adapted for threaded interconnection with a source of fluid such as a water pipe to removably attach faucet assembly 20 to the source of water.

A bearing member 68 in a form of a cylindrical plug is mounted in the upper end portion of passageway 62 for use in providing appropriate sealing surfaces for the assembly and contains a central passageway 70 which is positioned for relative alignment with the narrow vertical passageway 42 in swivel piece 26 upon appropriate rotation of spigot arm 22 with respect to the fitting. The bearing member or plug 68 is generally cylindrical in configuration with a flat upper surface 72 adapted to be positioned in alignment with bottom 60 of the recess formed by neck 56 and a cylindrical side wall 74 designed to substantially mate with the walls of the upper portion of passageway 62. The bottom end 76 of plug 68 is also flat and is designed to form a surface for capturing a helical spring 78. Closed bottom end 64 of the passageway 62 forms the other surface for capturing the other end of spring 78 located in passageway 62 so that the spring is located between surface 76 of the plug and bottom surface 64 of passageway 62. The helical spring 78 forms a biasing means for directing sealing plug 68 upward into tight sealing engagement with the under surface 44 of swivel piece 26 of the spigot. The helical spring 78 does not prevent with flow of water through lateral passage 66 and vertical passage 62 including the passageway 70 through bearing plug 68.

Bearing plug 68 is maintained in sealing relationship with the wall of passageway 62 by means of a sealing resilient O-ring 80 housed in an annular recess 82 in the side walls of the plug 68. Similarly, the upper surface 72 of the plug is maintained in sealing engagement with the under surface 44 of swivel piece 26 by means of a resilient seal 84 positioned in an annular recess 86 in the upper surface 72 of plug 68.

In a similar fashion the outer surface of the lower portion 30 of swivel piece 26 is maintained in sealing relationship with the inner surface 88 of collor 58 by means of a pair of adjacent O-rings 90 and 92 which are mounted in annular recesses 94 and 96 respectively in the side walls of lower portion 30 of swivel piece 26. Thus, as piece 26 rotates with respect to neck 56 a seal is maintained therebetween. Also as swivel piece 26 rotates with respect to fixed fitting 24 and particularly plug 68 the seal 84 maintains a sealing relationship therebetween.

Figure 5:
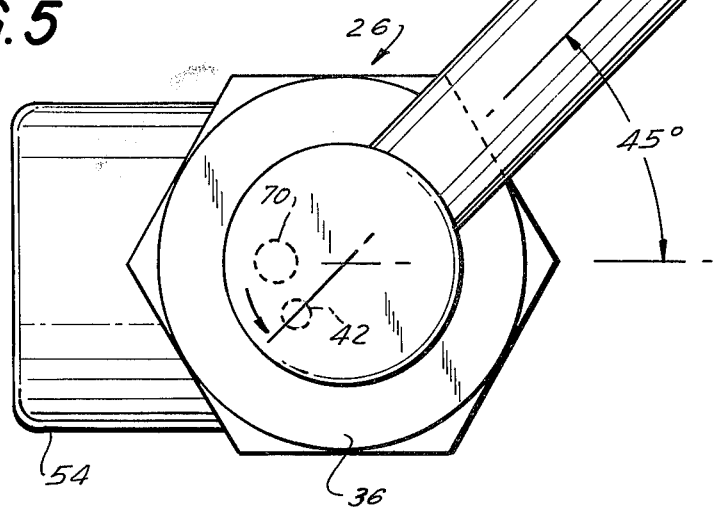
FIG. 5 is a top plan view of a portion of the spigot arm and fitting attached thereto showing the valve in the closed position.

The flow from the fluid source to the nozzle 48 is interrupted by rotating spigot 22 to bring vertical passageway 42 out of alignment with the vertical passageway 70 through bearing member 68. The location of these two passageways with respect to one another and their relative dimensions determine the degree of rotation necessary for the spigot to open and close flow. As shown in FIG. 5, a rotation of 45 degrees in either direction is sufficient to bring vertical passageways 42 and 70 fully into and out of alignment. Naturally partial alignment therebetween will permit the flow of a lesser volume of fluid through the faucet assembly 20. Full alignment permits full passage of fluid and complete nonalignment as depicted in FIG. 5 prevents flow of fluid between aperture 66 in the fitting and aerator 48 at the end of the spigot arm. The amount of rotation required to open and close this valve assembly is a matter of choice with 45 degrees being the degree of rotation chosen for the depicted embodiment. This permit quick and efficient opening and closing of the valve. Naturally the size of apertures 42 and 70 also add a variable in determining the amount of rotation required for partial or full opening and closing of the valve. It should also be noted that there is only a small degree of rotation which brings the apertures 42 and 70 into alignment and any other position of the spigot arm will maintain the valve in closed position. In the depicted embodiment the aperture 42 is located relative to aperture 70 so that the passageway through faucet 22 is fully opened when the spigot arm is directly perpendicular to the rear wall of the sink of which it is mounted. Therefore, by merely moving the spigot arm in either direction as much as 45 degrees will shut-off flow and bringing it back to the perpendicular position will fully open the valve again.

Assembly of the device is quite simple. Fitting 24 is threaded into engagement with the fluid source on the sink and is thereby fixed in position. Spigot arm 28 is threadedly mounted in the top end of swivel piece 26 and piece 26 is seated in the recess formed by neck 56. Swivel nut 36 is then threadedly interengaged with neck 56 until it seats on shoulder 34 which is aligned with the top rim of neck 56 thereby coupling swivel piece 26 and spigot 22 to the fitting. There is sufficient clearance between the portion of spigot piece 26 mounted within neck 56 and the inner walls thereof to permit rotation of the spigot with respect to the fitting.

Prior to coupling of swivel piece 26 with the fitting helical spring 78 is positioned in passageway 62 along with bearing plug 68. When piece 26 is seated and held in position by swivel nut 36 it will interengage with plug 68 and bias spring 78 so that the plug is biased upwardly against the under surfaces 44 of piece 26 and leakage between adjoining surfaces 44 on the spigot and 60 on the fitting is prevented. The assembly is then in operable condition for use.

In regard to materials, the majority of the components of faucet 20 can be of a conventional metal such as brass, bronze or stainless steel or other conventional material commonly used in faucet construction. This is true of all components with the exception of the bearing plug 68 and the O-rings which are used as sealing members. Suitable material for the O-rings and plug is a conventional natural or synthetic rubber material or a plastic material or any conventional substitute therefor. It is also contemplated that the O-ring can be manufactured of a plastic material such as a conventional flourocarbon, for example, such as Viton manufactured by the DuPont Corporation. A suitable rubber material for use as the O-rings is ETR manufactured by DuPont Corporation. It has been found acceptable to use a Delrin bearing for plug 68 to form the bearing member and hold O-rings 80 and 84 in tight sealing engagement to prevent leakage in the assembly. The type of construction of plug 68 is that commonly known as a dynamic thrust bearing.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A faucet assembly comprising; a spigot having a passageway therethrough, one end of the spigot being open for exit of fluid and the other end adapted to be rotatably mounted to one end of a stationary fitting, the other end of the fitting adapted to be removably connected to a fluid source, the fitting having a passageway therethrough, a valve means operable upon rotation of the spigot a predetermined degree relative to the fitting to open and close a flow path for flow of fluid between the fitting and spigot and consequently between a source of fluid and the open exit end of the spigot, sealing means on the fitting and spigot to prevent leakage of fluid in the open and closed positions of the valve means to thereby restrict fluid flow to the passageways through the assembly, the spigot including an upright base portion with a laterally extending spigot arm extending from the upper end portion of the base and terminating in the exit opening of the spigot, the fitting having an upwardly extending neck adapted to receive a portion of the base of the spigot therein, releasable connecting means to couple the base of the spigot to the fitting, the undersurface of the base of the spigot having an opening for the passageway therethrough and forming a mating surface with a corresponding surface on the fitting with an opening therein for the passageway through the fitting, the spigot base being rotatable with respect to the fitting so that the undersurface of the base slides over the mating surface of the fitting to bring the openings through the fitting and the spigot into and out of alignment to open and close the flow path through the faucet assembly, at least one sealing ring on the base of the spigot for sealing engagement with the inner surface of the neck of the fitting to provide sealing interengagement therebetween, a bearing member mounted in the passageway of the fitting and having a passageway therethrough, the bearing member having an upper surface aligned with the surface of the fitting mating with the undersurface of the spigot base, at least one sealing ring in the upper surface of the bearing member to seal against the undersurface of the spigot base and maintain the sealing relationship as the spigot base is rotated with respect to the fitting and the bearing member mounted therein, at least one sealing ring positioned along the side walls of the bearing member for sealing engagement with the adjacent side walls of the passageway through the fitting in which the bearing member is mounted to provide a sealing engagement therebetween, the passageway through the bearing member communicating with the passageway through the fitting and adapted to communicate with the passageway through the spigot when the spigot is rotated relative to the fitting into the open position.

2. The invention in accordance with claim 1 wherein the sealing rings are resilient O-rings.

3. The invention in accordance with claim 1 wherein the bearing member is formed of a substantially rigid plastic material.

4. The invention in accordance with claim 1 wherein biasing means is provided between the undersurface of the bearing member and an adjacent surface in the passageway through the fitting so as to bias the bearing member into tight sealing engagement with the base of the spigot.

5. The invention in accordance with claim 4 wherein the biasing means is a helical spring.

6. The invention in accordance with claim 1 wherein the other end of the fitting is provided with a threaded aperture for facilitating interengagement with a source of fluid.

7. The invention in accordance with claim 1 wherein the through passageways in the spigot and fitting are positioned respectively so that approximately 45° of relative rotation between the spigot and fitting will bring the passageways into and out of alignment.

* * * * *